United States Patent
Sobanski et al.

(10) Patent No.: US 10,227,933 B2
(45) Date of Patent: Mar. 12, 2019

(54) AIRCRAFT POWER SETTING TRIMS FOR LIFE EXTENSION

(71) Applicant: UNITED TECHNOLOGIES CORPORATION, Farmington, CT (US)

(72) Inventors: Kurt J. Sobanski, Glastonbury, CT (US); Richard P. Meisner, Glastonbury, CT (US); Robert J. Bengtson, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 508 days.

(21) Appl. No.: 14/620,271

(22) Filed: Feb. 12, 2015

(65) Prior Publication Data

US 2019/0031358 A1    Jan. 31, 2019

(51) Int. Cl.
    *F02C 9/44*        (2006.01)
    *B64C 19/00*     (2006.01)

(52) U.S. Cl.
    CPC .............. *F02C 9/44* (2013.01); *B64C 19/00* (2013.01); *F05D 2270/051* (2013.01)

(58) Field of Classification Search
    CPC ........ B64C 19/00; B64D 31/00; B64D 31/12; B64D 31/10; F02C 9/42; F02C 9/44; F05D 2270/07
    See application file for complete search history.

(56) References Cited

U.S. PATENT DOCUMENTS

| | | | |
|---|---|---|---|
| 4,437,303 A | 3/1984 | Cantwell | |
| 5,168,447 A | 12/1992 | Moore | |
| 5,299,765 A * | 4/1994 | Blechen | G05D 1/0661 244/182 |
| 5,394,689 A * | 3/1995 | D'Onofrio | F02C 9/28 60/204 |
| 6,459,963 B1 * | 10/2002 | Bennett | F02C 9/28 701/14 |
| 6,487,490 B1 * | 11/2002 | Kamath | F02C 9/28 60/204 |
| 8,290,683 B2 * | 10/2012 | Luppold | F02C 9/42 340/945 |
| 8,381,510 B2 * | 2/2013 | Brown | F02C 9/00 60/233 |
| 8,682,562 B2 | 3/2014 | Shepler | |
| 2006/0010972 A1 * | 1/2006 | Brown | B64C 19/00 73/178 T |
| 2009/0090817 A1 | 4/2009 | Monka | |
| 2009/0132107 A1 * | 5/2009 | DeJonge | G05D 1/0661 701/15 |
| 2010/0275575 A1 * | 11/2010 | Brown | F02C 9/00 60/204 |
| 2011/0184623 A1 * | 7/2011 | De Boer | B64D 31/10 701/99 |

(Continued)

*Primary Examiner* — Thomas G Black
*Assistant Examiner* — Ce Li Li
(74) *Attorney, Agent, or Firm* — Cantor Colburn LLP

(57) ABSTRACT

A method of controlling thrust for a gas turbine engine of an aircraft is provided. The method includes determining a fan speed required for minimum thrust to achieve an aircraft operation. The method also includes determining an excess amount of thrust generated by the gas turbine engine. The method also includes reducing the amount of thrust generated by the gas turbine engine.

22 Claims, 4 Drawing Sheets

(56) References Cited

U.S. PATENT DOCUMENTS

2012/0158220 A1* 6/2012 Accardo .............. G05D 1/0646
  701/15
2013/0211636 A1* 8/2013 Martins ................ G05D 1/0083
  701/15

* cited by examiner

AIRCRAFT POWER SETTING TRIMS FOR LIFE EXTENSION

TECHNICAL FIELD OF THE DISCLOSED EMBODIMENTS

The present disclosures relate generally to a gas turbine engine and, more particularly, to setting engine trims to extend the life of the engine.

BACKGROUND OF THE DISCLOSED EMBODIMENTS

Generally, many modern high bypass turbofan engines used in commercial passenger and military transport aircraft use fan rotor speed settings to guarantee thrust during critical flight segments such as takeoff and climb to ensure safety and proper flight characteristics. Many factors are used to set thrust and the corresponding required engine fan speed. Variables that affect the settings include possible combinations of the following items: aircraft weight, ambient temperature, altitude, humidity, wind speed and other airport operational factors. To guarantee the required thrust, engine manufacturers must account for uncertainty in items such as sensor measurement biases, transient overshoots and engine deterioration. Consideration of the listed variables results in a stacked list of uncertainties. The stack-up applies to new engines and engines near the end of their hot section life. Because of the thrust setting approach, new engines often produce more thrust than required during takeoff and climb mission segments. As a result, newer engines use up turbine life by operating at higher than required temperatures and speeds.

SUMMARY OF THE DISCLOSED EMBODIMENTS

In one aspect, a method of controlling thrust for a gas turbine engine of an aircraft is provided. The method includes determining a fan speed required for minimum thrust to achieve an aircraft operation. The method also includes determining an excess amount of thrust generated by the gas turbine engine. The method also includes reducing the amount of thrust generated by the gas turbine engine.

In a further embodiment of the above, determining a fan speed includes determining a fan speed based on a gross weight of the aircraft.

In a further embodiment of any of the above, determining a fan speed includes determining a fan speed based on a length of a runway upon which the aircraft is located.

In a further embodiment of any of the above, determining a fan speed includes determining a fan speed based on an ambient temperature.

In a further embodiment of any of the above, determining an excess amount of thrust includes determining a speed of the aircraft.

In a further embodiment of any of the above, determining a speed of the aircraft includes determining a ground speed of the aircraft.

In a further embodiment of any of the above, determining a speed of the aircraft includes determining an air speed of the aircraft.

In a further embodiment of any of the above, determining an excess amount of thrust includes determining a remaining length of a runway upon which the aircraft is located.

In a further embodiment of any of the above, determining a fan speed required for minimum thrust to achieve an aircraft operation includes determining a fan speed required for minimum thrust to achieve takeoff.

In a further embodiment of any of the above, determining a fan speed required for minimum thrust to achieve an aircraft operation includes determining a fan speed required for minimum thrust to achieve climb.

In one aspect, a method of controlling thrust for a gas turbine engine of an aircraft, wherein the gas turbine engine includes a fan is provided. The method includes determining a fan speed required for minimum thrust to achieve an aircraft operation based on a gross weight of the aircraft. The method also includes determining an excess amount of thrust generated by the gas turbine engine by determining a speed, climb rate or other dynamic conditions of the aircraft. The method also includes reducing the amount of thrust generated by the gas turbine engine.

In a further embodiment of the above, determining a fan speed includes determining a fan speed based on a length of a runway upon which the aircraft is located In a further embodiment of any of the above, determining a fan speed includes determining a fan speed based on an ambient temperature.

In a further embodiment of any of the above, determining a speed of the aircraft includes determining a ground speed of the aircraft.

In a further embodiment of any of the above, determining a speed of the aircraft includes determining an air speed of the aircraft.

In a further embodiment of any of the above, determining an excess amount of thrust includes determining a remaining length of a runway upon which the aircraft is located.

In a further embodiment of any of the above, determining a fan speed required for minimum thrust to achieve an aircraft operation includes determining a fan speed required for minimum thrust to achieve takeoff.

In a further embodiment of any of the above, determining a fan speed required for minimum thrust to achieve an aircraft operation includes determining a fan speed required for minimum thrust to achieve climb.

In one aspect, a gas turbine engine is provided. The gas turbine engine includes a fan, wherein a fan speed determines a thrust of the gas turbine engine. A flight control system determines a fan speed required for minimum thrust to achieve an aircraft operation. The flight control system further determines an excess amount of thrust generated by the gas turbine engine. The flight control system reduces the amount of thrust generated by the gas turbine engine by reducing a fan speed.

In a further embodiment of the above, the flight control system determines a fan speed required for minimum thrust to achieve an aircraft operation based on a gross weight of the aircraft. The flight control system also determines an excess amount of thrust generated by the gas turbine engine by determining a speed, climb rate or other dynamic conditions of the aircraft.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
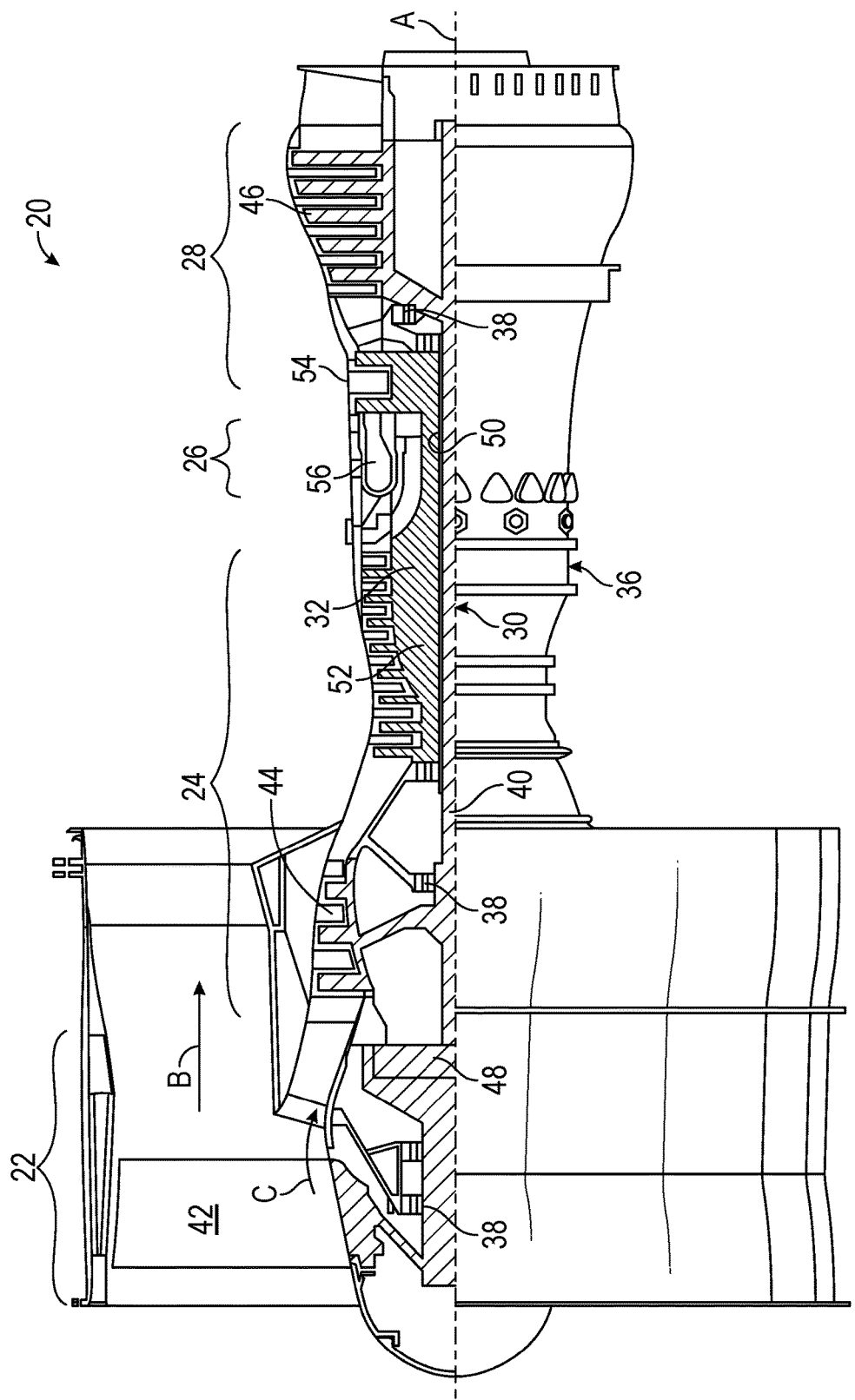
FIG. 1 is a sectional view of a gas turbine engine in an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel burned per hour divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
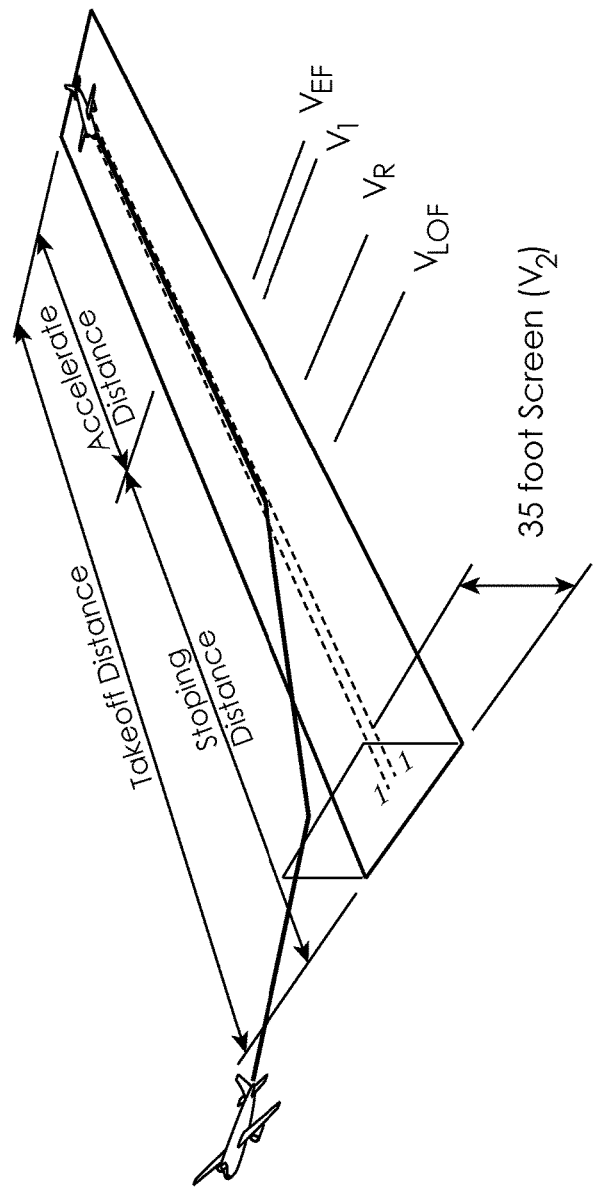
FIG. 2 is an illustration of an exemplary takeoff and flight path in accordance with an embodiment.
Figure 3:
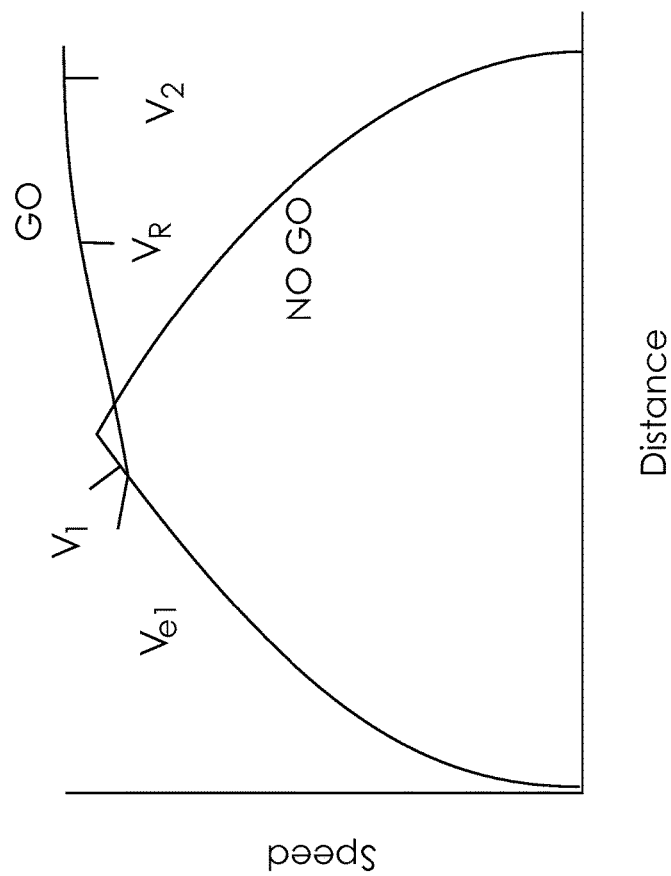
FIG. 3 is a graph of speed versus distance along a runway during takeoff in accordance with an embodiment.

Referring to FIGS. 2-3, airframe manufactures must meet certification requirements for various flight segments by specifying minimum required thrust levels during takeoff, climb and step climbs between cruise altitudes. Takeoff parameters that affect the power setting include aircraft gross weight, ambient temperature and runway length. For example, the takeoff path, as illustrated in FIG. 2, includes the ground roll for acceleration, rotation, lift off and two climb segments. One climb segment ensures clearing any 35 foot high barrier at the end of the runway. A second climb rate depends on the number of engines for departing the airport safely. These minimum thrust levels apply to all engines and account for the unlikely scenario that one engine becomes inoperative during takeoff. The critical GO/NO GO decision speed (V1) is set such that the pilot can abort the takeoff with enough runway to decelerate and stop the aircraft safely. Until reaching V1, an engine failure ($V_{EF}$) would initiate a takeoff abort sequence. After V1, the remaining engines must produce enough thrust to achieve rotation speed ($V_R$) and at a minimum V2 speed clear any limiting obstacles along the takeoff flight path.

Similar requirements must be met during step climbs between cruise segments. Climb rates for these segments ensure that aircraft are able to change between optimum efficiency altitudes while remaining under air traffic control constraints. Many factors contribute to the engine power settings for takeoff and climb. These factors must be accounted for during engine design and aircraft integration. Uncertainty in the parameters can potentially be addressed by directly accounting for parameters such as aircraft gross weight, runway length, ambient temperature, ground speed, air speed, climb rate and even estimated remaining fuel.

The disclosed embodiments utilize aircraft parameters in the flight control system to bias the engine fan speed requirement during high thrust operation. For takeoff, the critical airplane parameters include ground and airspeed, runway position, takeoff distance (runway length), aircraft loading and other flight path requirements. The parameters needed by the approach pass through a communication link between the flight control and the engine control during flight operation. Flight control and engine control logic determine when to enable thrust trimming based on a system health assessment and flight conditions. Parameters passed between the engine control provide a trim request to the normal fan speed power setting to adjust for overthrust conditions. This may be accomplished by providing a limited authority decrement to the thrust request. The aircraft flight control trim calculations adapt to several different flight modes. If at any time system identified faults occur, the thrust trimming is disabled for the rest of the flight. The downtrim function is enabled only when all engines are operating and the system health is not degraded.

During takeoff, a first downward thrust trim occurs gradually when the aircraft exceeds the required speed trajectory prior to reaching V1, where the go/no-go decision is made. During this time, airspeed and wheel speed are checked against each other to ensure the lower of the two is used in the speed reading. Once the V1 point is passed or rotation occurs, the system switches to using airspeed only to get a more accurate measure of the predicted flight path trajectory based on head or tail winds or other influencing considerations and calculates a second downward thrust trim. Once rotation or liftoff occurs, the calculations use one of two thrust takeoff climb segments to ensure the aircraft is exceeding its climb gradient requirements to calculate a third downward thrust trim. These requirements differ based on the number of engines powering the aircraft. As the aircraft moves between cruise altitudes, similar logic applies to a fourth downward thrust trim, where the flight control calculates adjustments to limit engine wear during step climbs. The amount of downtrim requested by the flight control for any of the flight modes would depend on the aircraft and engine combination and the dynamics of the instantaneous flight condition. In each flight mode, the flight control determines an overthrust condition when the aircraft exceeds required airspeed and climb rates for a flight condition. The flight control system may use other calculated parameters such as remaining fuel to update its requirements for step climb rate during its mission.

Figure 4:
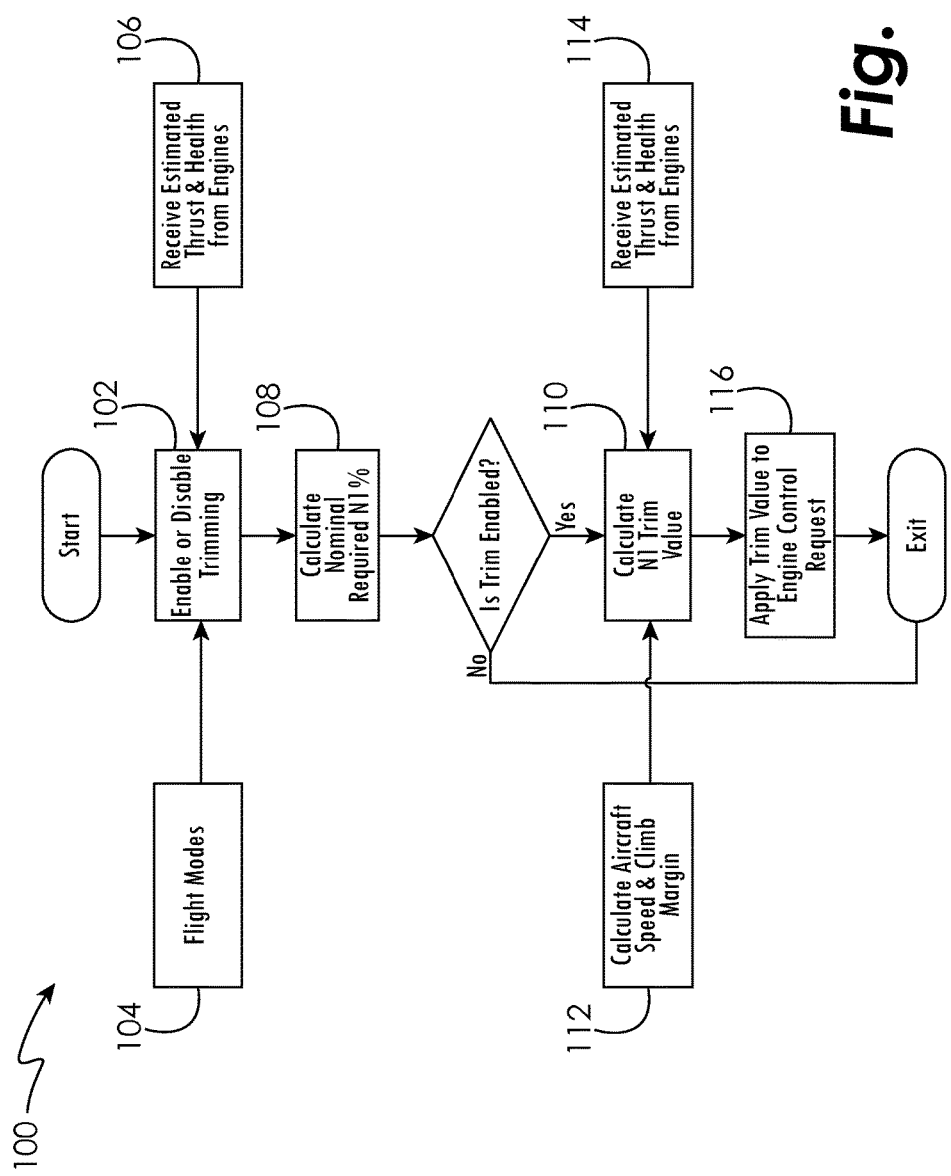
FIG. 4 is a process flow depicting an algorithm for thrust trimming in accordance with an embodiment.

FIG. 4 is depicts an algorithm 100 for thrust trimming in accordance with an embodiment. At step 102, thrust trimming is enabled or disabled. Whether the thrust trimming is enabled or disabled is dependent on a flight mode 104 and/or an estimated thrust and engine health 106. At step 108, a nominal thrust for the flight mode is determined. In one embodiment, the flight mode may include takeoff or climb.

The nominal thrust may be determined by determining a fan speed required for the minimum thrust to achieve the aircraft operation. In one embodiment, the fan speed is determined based on at least one of a gross weight of the aircraft, a length of a runway upon which the aircraft is located, or an ambient temperature. If the trim is enabled, at step 110 the amount of trim required is calculated. Determining the amount of trim required includes determining an excess amount of thrust being generated by the gas turbine engine. In one embodiment, determining an excess amount of thrust may include determining a speed of the aircraft or a climb margin of the aircraft 112. Determining a speed of the aircraft may include determining a ground speed of the aircraft. Determining a speed of the aircraft may include determining an air speed of the aircraft. In one embodiment, determining an excess amount of thrust may include receiving estimated thrust and health levels of the engine 114. In one embodiment, determining an excess amount of thrust may include determining a remaining length of a runway upon which the aircraft is located. At step 116, the calculated trim is applied to reduce the amount of thrust being generated by the gas turbine engine.

The disclosed method removes the uncertainty of actual thrust from the takeoff and climb requirements. By measuring aircraft airspeed and climb rate directly; the flight control can trim the engine to produce slightly less thrust only when it is not needed for safe operation. Accordingly, the engine does not "give away" life at high temperature when it is not needed. Optionally, an engine trim programming plug can be used to set trim authority or enable and disable the power setting trim logic in the engine.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of controlling thrust for a gas turbine engine of an aircraft, the method comprising:
   determining a fan speed required for minimum thrust to achieve an aircraft operation, wherein the aircraft operation includes a climb;
   determining an excess amount of thrust generated by the gas turbine engine; and
   reducing the amount of thrust generated by the gas turbine engine during the aircraft operation by a limited authority decrement based on the excess amount of thrust generated by the gas turbine engine;
   wherein a first reduction of thrust occurs gradually when speeds of the aircraft exceed a required speed trajectory prior to reaching a critical go/no go decision speed, the speeds of the aircraft being based on the lesser of ground speed of the aircraft and airspeed of aircraft.

2. The method of claim 1, wherein determining a fan speed further comprises determining a fan speed based on a gross weight of the aircraft.

3. The method of claim 1, wherein determining a fan speed further comprises determining a fan speed based on a length of a runway upon which the aircraft is located.

4. The method of claim 1, wherein determining a fan speed further comprises determining a fan speed based on an ambient temperature.

5. The method of claim 1, wherein determining an excess amount of thrust further comprises determining a speed of the aircraft.

6. The method of claim 5, wherein determining a speed of the aircraft further comprises determining a ground speed of the aircraft.

7. The method of claim 5, wherein determining a speed of the aircraft further comprises determining an air speed of the aircraft.

8. The method of claim 1, wherein determining an excess amount of thrust further comprises determining a remaining length of a runway upon which the aircraft is located.

9. The method of claim 1, wherein determining a fan speed required for minimum thrust to achieve an aircraft operation further comprises determining a fan speed required for minimum thrust to achieve takeoff.

10. The method of claim 1, wherein the determining the excess amount of thrust includes ensuring that the aircraft exceeds a selected climb gradient.

11. The method of claim 1, wherein the determining an excess amount of thrust includes receiving at least one of an estimated thrust for the gas turbine engine and a health level of the engine.

12. The method of claim 1 further including a second reduction of thrust, wherein the second reduction of thrust occurs when the critical go/no decision speed is passed, and the speeds of the aircraft being based on the airspeed of the aircraft.

13. A method of controlling thrust for a gas turbine engine of an aircraft, wherein the gas turbine engine includes a fan, the method comprising:
   determining a fan speed required for minimum thrust to achieve an aircraft operation by a limited authority decrement based on a gross weight of the aircraft, wherein the aircraft operation includes a climb;
   determining an excess amount of thrust generated by the gas turbine engine by determining a speed, climb rate or other dynamic conditions of the aircraft; and
   reducing the amount of thrust generated by the gas turbine engine during the aircraft operation based on the excess amount of thrust generated by the gas turbine engine, wherein a first reduction of thrust occurs gradually when speeds of the aircraft exceed a required speed trajectory prior to reaching a critical go/no go decision speed, the speeds of the aircraft being based on the lesser of ground speed of the aircraft and airspeed of aircraft.

14. The method of claim 13, wherein determining a fan speed further comprises determining a fan speed based on a length of a runway upon which the aircraft is located.

15. The method of claim 13, wherein determining a fan speed further comprises determining a fan speed based on an ambient temperature.

16. The method of claim 13, wherein determining a speed of the aircraft further comprises determining a ground speed of the aircraft.

17. The method of claim 13, wherein determining a speed of the aircraft further comprises determining an air speed of the aircraft.

18. The method of claim 13, wherein determining an excess amount of thrust further comprises determining a remaining length of a runway upon which the aircraft is located.

19. The method of claim 13, wherein determining a fan speed required for minimum thrust to achieve an aircraft operation further comprises determining a fan speed required for minimum thrust to achieve takeoff.

20. A gas turbine engine comprising:
   a fan, wherein a fan speed determines a thrust of the gas turbine engine; and
   a flight control system to determine a fan speed required for minimum thrust to achieve an aircraft operation, wherein the flight control system further determines an excess amount of thrust generated by the gas turbine engine, and wherein the flight control system reduces the amount of thrust generated by the gas turbine engine by reducing a fan speed during the aircraft operation based on the excess amount of thrust generated by the gas turbine engine, wherein a first reduction of thrust occurs gradually when speeds of the aircraft exceed a required speed trajectory prior to reaching a critical go/no go decision speed, the speeds of the aircraft being based on the lesser of ground speed of the aircraft and airspeed of aircraft.

21. The gas turbine engine of claim 20, wherein the flight control system:
   determines a fan speed required for minimum thrust to achieve an aircraft operation based on a gross weight of the aircraft; and
   determines an excess amount of thrust generated by the gas turbine engine by determining a speed, climb rate or other dynamic conditions of the aircraft.

22. A method increasing the life a gas turbine engine of an aircraft, wherein the gas turbine engine includes a fan, the method comprising:
   determining a fan speed required for minimum thrust to achieve an aircraft operation based on a gross weight of the aircraft;
   determining an excess amount of thrust generated by the gas turbine engine by determining a speed, climb rate or other dynamic conditions of the aircraft; and
   reducing the amount of thrust generated by the gas turbine engine during the aircraft operation by a limited authority decrement based on the excess amount of thrust generated by the gas turbine engine, wherein a first reduction of thrust occurs gradually when speeds of the aircraft exceed a required speed trajectory prior to reaching a critical go/no go decision speed, the speeds of the aircraft being based on the lesser of ground speed of the aircraft and airspeed of aircraft.

* * * * *